US012744958B2

(12) United States Patent
Li et al.

(10) Patent No.: US 12,744,958 B2
(45) Date of Patent: Sep. 22, 2026

(54) VIDEO DETERMINATION METHOD AND APPARATUS, ELECTRONIC DEVICE AND STORAGE MEDIUM

(71) Applicant: Lemon Inc., Grand Cayman (KY)

(72) Inventors: Jianwei Li, Los Angeles, CA (US); Xiao Yang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 19/099,533

(22) PCT Filed: Jul. 12, 2023

(86) PCT No.: PCT/SG2023/050489

§ 371 (c)(1),
(2) Date: Jan. 29, 2025

(87) PCT Pub. No.: WO2024/030075

PCT Pub. Date: Feb. 8, 2024

(65) Prior Publication Data

US 2026/0046469 A1 Feb. 12, 2026

(30) Foreign Application Priority Data

Jul. 30, 2022 (CN) ........................ 202210911515.1

(51) Int. Cl.
*H04N 21/43* (2011.01)
*G06V 40/16* (2022.01)
(Continued)

(52) U.S. Cl.
CPC ..... *H04N 21/43072* (2020.08); *G06V 40/168* (2022.01); *H04N 21/439* (2013.01); *H04N 21/44008* (2013.01); *H04N 21/8547* (2013.01)

(58) Field of Classification Search
CPC .......... G06V 40/168; H04N 21/43072; H04N 21/439; H04N 21/44008; H04N 21/8547
See application file for complete search history.

(56) References Cited

U.S. PATENT DOCUMENTS 6,889,325 B1 * 5/2005 Sipman ................ H04L 63/126 380/37
8,190,435 B2 * 5/2012 Li-Chun Wang ..... G06F 16/683 704/270
(Continued)

FOREIGN PATENT DOCUMENTS

CN 104756188 A 7/2015
CN 112188304 A 1/2021
(Continued)

OTHER PUBLICATIONS

ISA Intellectual Property Office of Singapore, International Search Report Issued in Application No. PCT/SG2023/050489, Jan. 30, 2024, 7 pages.

*Primary Examiner* — Michael B. Pierorazio
(74) *Attorney, Agent, or Firm* — Alleman Hall LLP

(57) ABSTRACT

Embodiments of the present disclosure provide a video determination method and apparatus, an electronic device, and a storage medium. The method includes: acquiring, in response to an effect trigger operation, a target facial image including a target object; determining a target audio, and determining a key video frame sequence corresponding to the target audio; determining, based on the key video frame sequence and the target facial image, a target facial feature in the target facial image that is presented when the target audio is played; and determining a target effect audio and video based on the target facial feature and the target audio.

20 Claims, 4 Drawing Sheets

(51) Int. Cl.
*H04N 21/439* (2011.01)
*H04N 21/44* (2011.01)
*H04N 21/8547* (2011.01)

(56) References Cited

U.S. PATENT DOCUMENTS 8,290,423 B2 * 10/2012 Wang .................... H04B 17/23 455/2.01
8,537,166 B1 * 9/2013 Diard .................... G06T 3/4038 345/1.3
8,650,603 B2 * 2/2014 Doets ............... H04N 21/25891 725/38
8,688,600 B2 * 4/2014 Barton ............... G06Q 30/0601 84/603
8,725,829 B2 * 5/2014 Wang .................... G11B 27/28 704/239
8,811,885 B2 * 8/2014 Wang .................... H04H 60/44 455/2.01
8,990,842 B2 * 3/2015 Rowley .................. G06T 15/20 725/12
10,885,693 B1 * 1/2021 Saragih .................. G06T 17/00
11,089,238 B2 * 8/2021 Shaburov ................ G06T 11/00
11,284,144 B2 * 3/2022 Kotsopoulos ............. G06T 1/20
11,831,937 B2 * 11/2023 Kotsopoulos ........ H04N 21/234
12,231,709 B2 * 2/2025 Kotsopoulos ...... H04N 21/8456
2002/0072982 A1 * 6/2002 Barton ............... G06Q 30/0625 705/14.1
2002/0083060 A1 * 6/2002 Wang .................... G11B 27/28
2004/0199387 A1 * 10/2004 Wang .................... G10L 15/26 704/E15.045
2005/0028195 A1 * 2/2005 Feinleib ................ H04N 7/163 725/135
2005/0091274 A1 * 4/2005 Stanford ............. G06F 16/9577
2005/0192863 A1 * 9/2005 Mohan .................. G06Q 30/02 705/14.27
2005/0209917 A1 * 9/2005 Anderson .......... G06Q 30/0214 705/14.16
2006/0094500 A1 * 5/2006 Dyke ..................... A63F 13/52 463/30
2006/0195359 A1 * 8/2006 Robinson ........... G06Q 30/0236 705/14.19
2006/0224452 A1 * 10/2006 Ng ..................... G06Q 30/0242 705/14.27
2006/0256133 A1 * 11/2006 Rosenberg ............. G06F 3/013 345/619
2007/0124756 A1 * 5/2007 Covell ................. G06F 16/635 348/E7.071
2007/0130580 A1 * 6/2007 Covell ................. G11B 27/034 725/18
2007/0143778 A1 * 6/2007 Covell .............. H04N 21/8133 725/135
2007/0179850 A1 * 8/2007 Ganjon ................. G06Q 30/00 705/14.27
2007/0192784 A1 * 8/2007 Postrel ............... H04N 21/4316 725/23
2007/0214049 A1 * 9/2007 Postrel ................ H04N 21/475 725/32
2008/0052062 A1 * 2/2008 Stanford ................ G10L 15/26 704/E15.045
2009/0044113 A1 * 2/2009 Jones ..................... G06T 13/40 715/707
2009/0198701 A1 * 8/2009 Haileselassie ...... G06F 16/9535
2009/0313670 A1 * 12/2009 Takao .................... H04N 21/47 725/110
2010/0034466 A1 * 2/2010 Jing ..................... G06F 18/214 382/195
2010/0114713 A1 * 5/2010 Anderson ............. G06Q 20/10 705/14.69
2011/0273455 A1 * 11/2011 Powar .................... G11B 27/10 345/473
2012/0011545 A1 * 1/2012 Doets ................ H04N 21/8153 725/38
2012/0076310 A1 * 3/2012 DeBusk .................. G10L 25/48 381/56
2012/0117596 A1 * 5/2012 Mountain .......... H04N 21/4147 725/39
2012/0124608 A1 * 5/2012 Postrel .............. G06Q 30/0215 725/23
2012/0191231 A1 * 7/2012 Wang .................. G06F 16/7834 700/94
2012/0221131 A1 * 8/2012 Wang .................... G06F 16/683 700/94
2012/0295560 A1 * 11/2012 Mufti .................... H04B 13/00 455/95
2012/0297400 A1 * 11/2012 Hill ........................ G06F 9/445 719/318
2012/0316969 A1 * 12/2012 Metcalf, III ....... G06Q 30/0269 705/14.66
2012/0317240 A1 * 12/2012 Wang .................... H04H 60/37 709/219
2013/0010204 A1 * 1/2013 Wang .................... H04B 17/23 348/725
2013/0029762 A1 * 1/2013 Klappert ............... A63F 13/792 463/31
2013/0031579 A1 * 1/2013 Klappert .............. H04N 21/812 725/32
2013/0042262 A1 * 2/2013 Riethmueller ... H04N 21/25866 725/14
2013/0044051 A1 * 2/2013 Jeong ............... H04N 21/42222 345/156
2013/0067512 A1 * 3/2013 Dion ...................... G06Q 30/02 725/32
2013/0073366 A1 * 3/2013 Heath ................ G06Q 30/0261 705/14.25
2013/0073377 A1 * 3/2013 Heath .................... G06Q 30/02 705/14.39
2013/0080242 A1 * 3/2013 Alhadeff ............ G06Q 30/0217 705/14.39
2013/0080262 A1 * 3/2013 Scott ...................... G06Q 30/02 705/14.68
2013/0085828 A1 * 4/2013 Schuster ............ G06Q 30/0207 705/14.39
2013/0111519 A1 * 5/2013 Rice ....................... G06Q 30/02 725/34
2013/0124073 A1 * 5/2013 Ren .......................... G08G 1/00 701/118
2014/0078148 A1 * 3/2014 Diard ........................ G06T 1/20 345/428
2014/0137139 A1 * 5/2014 Jones ................... H04N 21/458 725/18
2014/0214532 A1 * 7/2014 Barton ............... G06Q 30/0251 705/26.62
2014/0278845 A1 * 9/2014 Teiser .................. H04N 21/812 705/14.4
2015/0128180 A1 * 5/2015 Mountain ........ H04N 21/64322 725/39
2015/0229979 A1 * 8/2015 Wood ................. H04N 21/4663 725/14
2015/0237389 A1 * 8/2015 Grouf ................ H04N 21/4882 725/49
2016/0127793 A1 * 5/2016 Grouf ...................... H04N 5/45 725/46
2016/0165287 A1 * 6/2016 Wood ............... H04N 21/44222 725/14
2016/0323650 A1 * 11/2016 Grouf ................ H04N 21/4668
2017/0078727 A1 * 3/2017 Wood ............... H04N 21/44222
2017/0324995 A1 * 11/2017 Grouf ................ H04N 21/4821
2018/0262805 A1 * 9/2018 Grouf .............. H04N 21/26258
2020/0195882 A1 * 6/2020 Yi .......................... G06V 10/25

FOREIGN PATENT DOCUMENTS

CN 112911192 A 6/2021
CN 113282791 A 8/2021

* cited by examiner

VIDEO DETERMINATION METHOD AND APPARATUS, ELECTRONIC DEVICE AND STORAGE MEDIUM

CROSS-REFERENCE TO RELATED APPLICATIONS

The present application is a national stage application filed under 35 U.S.C. 371 based on International Patent Application No. PCT/SG2023/050489, filed on Jul. 12, 2023, which claims priority to Chinese Patent Application No. 202210911515.1, filed with the China National Intellectual Property Administration on Jul. 30, 2022, which are incorporated herein by reference in their entireties.

FIELD

Embodiments of the present disclosure relate to the field of image processing technologies, and for example, to a video determination method and apparatus, an electronic device, and a storage medium.

BACKGROUND

With the development of network technologies, application software using an artificial intelligence-based human-computer interaction mode is becoming increasingly popular, and a visual speech technology has become a new-generation human-computer interaction mode.

SUMMARY

According to a first aspect, an embodiment of the present disclosure provides a video determination method applied to a client. The method includes:

- acquiring, in response to an effect trigger operation, a target facial image including a target object;
- determining a target audio, and determining a key video frame sequence corresponding to the target audio;
- determining, based on the key video frame sequence and the target facial image, a target facial feature in the target facial image that is presented when the target audio is played; and
- determining a target effect audio and video based on the target facial feature and the target audio.

According to a second aspect, an embodiment of the present disclosure further provides a video determination apparatus configured in a client. The apparatus includes:

- a facial image acquisition module configured to acquire, in response to an effect trigger operation,
- a target facial image including a target object;
- a target audio determination module configured to determine a target audio and determine a key video frame sequence corresponding to the target audio;
- a target facial feature determination module configured to determine, based on the key video frame sequence and the target facial image, a target facial feature in the target facial image that is presented when the target audio is played; and
- a target effect audio and video determination module configured to determine a target effect audio and video based on the target facial feature and the target audio.

According to a third aspect, an embodiment of the present disclosure further provides an electronic device. The electronic device includes:

- one or more processors; and
- a storage apparatus configured to store one or more programs,
- where the one or more programs, when executed by the one or more processors, cause the one or more processors to implement the video determination method as described in any one of the embodiments of the present disclosure.

According to a fourth aspect, an embodiment of the present disclosure further provides a storage medium including computer-executable instructions that, when executed by a computer processor, are used to perform the video determination method as described in any one of the embodiments of the present disclosure.

BRIEF DESCRIPTION OF THE DRAWINGS

Throughout the drawings, the same or similar reference numerals denote the same or similar elements. It should be understood that the accompanying drawings are schematic and that parts and elements are not necessarily drawn to scale.

DETAILED DESCRIPTION OF EMBODIMENTS

Figure 1:
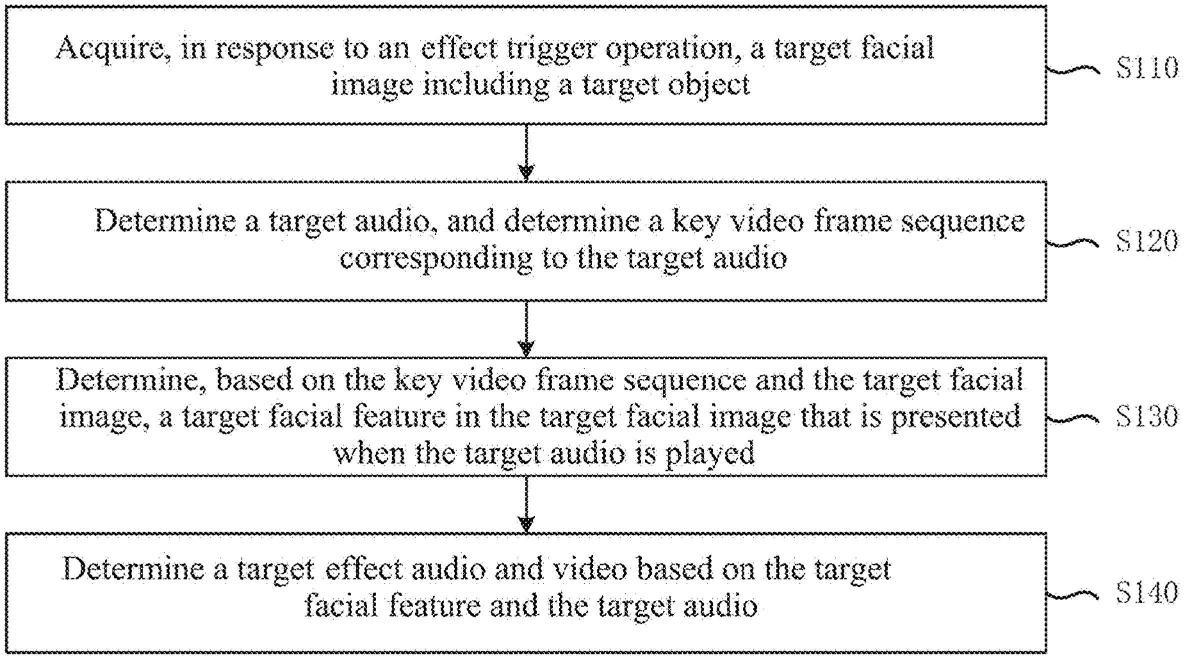
FIG. 1 is a schematic flowchart of a video determination method according to an embodiment of the present disclosure.

The embodiments of the present disclosure are described below with reference to the accompanying drawings. Although some embodiments of the present disclosure are shown in the accompanying drawings, it should be understood that the present disclosure may be implemented in various forms. It should be understood that the drawings and the embodiments of the present disclosure are for exemplary purposes only.

It should be understood that the various steps described in the method implementations of the present disclosure may be performed in different orders, and/or performed in parallel. Furthermore, additional steps may be included and/or the execution of the illustrated steps may be omitted in the method implementations.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

It can be understood that before the use of the solutions disclosed in the embodiments of the present disclosure, a user shall be informed of the type, range of use, use scenarios, etc., of personal information involved in the present disclosure in an appropriate manner in accordance with the relevant laws and regulations, and the authorization of the user shall be obtained.

For example, in response to reception of an active request from the user, prompt information is sent to the user to clearly inform the user that a requested operation will require access to and use of the personal information of the user. As such, the user can independently choose, based on the prompt information, whether to provide the personal information to software or hardware, such as an electronic device, an application program, a server, or a storage medium, that performs the operations in the present disclosure.

As an optional implementation, in response to the reception of the active request from the user, the prompt information may be sent to the user in the form of, for example, a pop-up window, in which the prompt information may be presented in text. Furthermore, the pop-up window may also include a selection control for the user to choose whether to "agree" or "disagree" to provide the personal information to the electronic device.

It can be understood that the above process of notifying and obtaining user authorization is only illustrative, and other manners that satisfy the relevant laws and regulations may also be applied in the implementations of the present disclosure.

It can be understood that the data involved in the present disclosure (including the data itself and the access to or use of the data) shall comply with the requirements of corresponding laws, regulations, and relevant provisions.

In the related art, a software developer may add various effect props in an application for a user to use in shooting a video. However, the effect props provided for the user are very limited at present, and the quality of the video and the richness of video content need to be further improved. Meanwhile, the video content and a selected effect are out of sync, resulting in poor user experience in interaction during use of the effect props. The present disclosure provides a video determination method and apparatus, an electronic device, and a storage medium, so as to achieve an effect of driving, on a device with limited computing power, a facial feature in a target facial image to be consistent with a facial feature presented when a target audio is played. Before the present disclosure is described, an exemplary description may be given to the application scenario. For example, when a user generates an effect video through application software, it may be desirable to combine a shot target facial image including a target object with a target audio selected by the user, thereby generating a target effect audio and video in which a facial feature of the target object is consistent with a facial feature presented when the target audio is played. For example, when the target audio is a news broadcast audio, and the user triggers an effect prop in a display interface, the target facial image corresponding to the user may be acquired in real time, and an effect video in which a facial feature of the user is consistent with a facial feature presented when the news broadcast audio is played is generated based on the currently acquired target facial image and the target audio. When the user triggers an effect operation, a facial image that needs to be processed may be uploaded, the currently uploaded facial image is determined as the target facial image, and an effect video in which the facial feature of the target object in the target facial image is consistent with a facial feature presented when the news broadcast audio is played may be generated based on the embodiments of the present disclosure. Further, as application software is increasingly deployed on a mobile terminal, a demand arises for implementing a process of generating the target effect audio and video through the mobile terminal. In this case, according to the embodiments of the present disclosure, an effect of driving, on a device with limited computing power, a facial feature in a target facial image to be consistent with a facial feature presented when a target audio is played can be achieved.

FIG. 1 is a schematic flowchart of a video determination method according to an embodiment of the present disclosure. This embodiment of the present disclosure is applicable to a case of driving, on a device with limited computing power, a facial feature in a target facial image to be consistent with a facial feature presented when a target audio is played, so as to generate a target effect video. The method may be performed by a video determination apparatus, and the apparatus may be implemented in the form of software and/or hardware, and optionally through an electronic device, where the electronic device may be a mobile terminal, a personal computer (PC) terminal, a server, etc.

As shown in FIG. 1, the method includes the following steps.

S110: Acquire, in response to an effect trigger operation, a target facial image including a target object.

Before the solutions of this embodiment of the present disclosure is described, it should first be noted that this embodiment of the present disclosure may be applied to a client. The client may be a program corresponding to a server and providing a local service for a user. Besides, the client may communicate with the server based on the Hypertext Transfer Protocol (HTTP). For example, a method model of the present disclosure may be integrated into application software supporting a variety of functions such as an effect video processing function and natural language processing, and the software may be installed in the electronic device, which may optionally be a mobile terminal, a PC terminal, etc. The application software may be a type of software that processes data such as images, videos, and speeches, as long as the data such as the images, the videos, and the speeches can be processed. Alternatively, the application software may be an application program that is specially developed in software to implement addition of an effect and displaying of the effects, or integrated in a corresponding page such that the user may process an effect video through the integrated page in the PC terminal.

In this embodiment, a control for triggering effects may be developed in advance in the application software or application program supporting the effect video processing function, and when it is detected that the user triggers the control, a response may be given to the effect trigger operation, to acquire the target facial image including the target object.

The target facial image may be an image that needs to be processed and includes facial contour information. The image may be an image acquired based on a terminal device, or an image pre-stored by the application software in a storage space. The terminal device may refer to an electronic product with an image shooting function, such as a camera, a smart phone, and a tablet computer. In practical application, when it is detected that the user triggers the effect operation, the terminal device may face the user so as to acquire the target facial image. When it is detected that the target object appears in a field of view of the terminal device, a video frame image in the current terminal device may be acquired as the target facial image; or when it is detected that the target object does not appear in a field of view of the terminal device, a video frame image displayed in the current terminal device does not include the target object, and then the video frame image in the current terminal device may not be acquired. Accordingly, the target facial image may include the target object. The target object may be any object whose posture or position information has changed in a frame-in picture, for example, may be a user or an animal.

It should be noted that when the target facial image is obtained, a video frame corresponding to a shot video may be processed. For example, a target object corresponding to the shot video may be preset, and when it is detected that an image corresponding to the video frame includes the target object, the image corresponding to the video frame may be used as the target facial image, such that an image of each video frame in the video can be subsequently tracked and processed with effects.

It should be further noted that there may be one or more target objects in a same shooting scene, and regardless of the quantity of target objects, the solutions provided in this embodiment of the present disclosure may be used for determining the effect video.

In practical application, the target facial image including the target object is usually acquired only when a specific effect trigger operation is triggered, where the effect trigger operation may include at least one of the following: triggering an effect prop; a frame-in picture including the target object; triggering an effect wake-up word using audio information; and a current body movement being consistent with a preset effect movement.

In this embodiment, a control for triggering the effect prop may be preset, and when the user triggers the control, an effect prop display page may pop up in a display interface, where a plurality of effect props may be displayed in the display page. The user may trigger a corresponding effect prop. For example, when it is detected that the user has triggered the prop corresponding to the acquired target facial image, it indicates that the effect trigger operation has been triggered. A shooting apparatus of the terminal device may have a specific shooting field of view, and when it is detected that a facial image of the target object is included in the field of view, it indicates that the effect trigger operation has been triggered. For example, a user may be preset as the target object, and when it is detected that a facial image of the user is included in the field of view, it may be determined that the effect trigger operation has been triggered. Alternatively, the facial image of the target object may be pre-stored in the terminal device, and when it is detected that a plurality of facial images appear in the field of view and that the plurality of facial images include the facial image of the preset target object, it may be determined that the effect trigger operation has been triggered, such that the terminal device may track the facial image of the target object and obtain the target facial image of the target object. In another implementation, audio information of the user may be acquired in advance, and the acquired audio information may be analyzed and processed so as to recognize a text corresponding to the audio information. If the text corresponding to the audio information includes a preset wake-up word, the wake-up word optionally being a word such as "Please shoot the current image" or "Please turn on the effect function", it indicates that the target facial image in the display interface can be obtained. In still another implementation, some body movements may be preset as effect trigger movements, and when it is detected that a body movement currently performed by the user in the field of view is consistent with the preset body movement, it may be determined that the effect operation has been triggered. Optionally, the preset body movement may be raising hands, opening the mouth, turning the head, etc.

S120: Determine a target audio, and determine a key video frame sequence corresponding to the target audio.

The target audio may be a multimedia data stream storing sound content, and in addition, the sound content stored in the data stream may be sound information satisfying a current requirement of the user. For example, the target audio may be a news reading audio or an audio of a movie clip.

It should be noted that the target audio may be determined by the user through random selection from an audio display page of the application software. Alternatively, the target audio may be pre-stored at an early development stage, and imported directly from the storage space to the current client after the user triggers the effect prop. Alternatively, the user may upload an audio file to the current client as the target audio in real time or periodically via an external device.

In this embodiment, there may be at least two methods for determining the target audio. One method may be: obtaining the target audio through selection based on an audio displayed in the display interface. Optionally, determining the target audio includes: displaying at least one audio to be selected; and determining the target audio based on a trigger operation on the at least one audio to be selected within first preset duration.

There may be one or more audios to be selected, and there is a corresponding key video frame sequence for each audio to be selected. In this embodiment, an audio selection countdown is further displayed in the display interface while the user is provided with an audio to be selected that is associated with an effect, where the countdown is preset selection duration. It can be understood that the user may perform, through a trigger operation, selection from a plurality of audios to be selected, where when selection duration reaches first preset duration, i.e., when the audio selection countdown returns to zero, an audio to be selected that is selected by the user at this moment is the target audio. Of course, when the first preset duration is not reached, the user may also deliver a confirmation command based on a determination control, so as to directly terminate the timing of the audio selection countdown and use an audio to be selected that is currently selected as the target audio. Those skilled in the art should understand that when there are a plurality of audios to be selected, the user may sequentially perform selection from the plurality of audios according to his or her own wishes, but after the selection duration reaches the first preset duration, the application may use only a last audio to be selected that is selected by the user as the target audio. Alternatively, the user may perform, through the trigger operation, selection from the plurality of the audios to be selected, where when the selection duration reaches the first preset duration, statistics on a trigger frequency of each of the audios to be selected in the current display interface within the first preset duration may be collected, and an audio to be selected that has the highest trigger frequency may be used as the target audio. In this way, the audios displayed in the display interface have been processed, which can improve the efficiency of generating a target effect audio and video.

Another method may be as follows: The target audio may be dynamically adjusted. For example, a currently uploaded audio may be processed in real time, and in this case, the uploaded audio may be used as an audio to be selected, so as to determine the target audio. Optionally, determining the target audio includes: receiving an uploaded audio to be processed as the target audio.

The audio to be processed may be an audio that needs to be processed and uploaded to the client currently.

In practical application, the audio that needs to be processed may be uploaded to the client in real time or periodically, and the uploaded audio may be used as the target audio. In this way, the richness and the interestingness of content of the obtained effect video are improved, the user experience in interaction during use of the effect prop is improved, and a personalized requirement of the user is satisfied.

In practical application, the target audio is a speech including a plurality of words, and when each word is said by a specific user, there is a corresponding facial movement, for example, a mouth shape or an eye and brow expression. Therefore, after the target audio is determined, a video corresponding to the target audio may be determined, and a plurality of video frame images in which the facial feature changes may be extracted from the video as the key video frame sequence.

It should be noted that if the target audio is determined from the at least one audio to be selected that is displayed in the display interface, the above at least one audio to be selected may be processed in advance to obtain a corresponding key video frame sequence, and each key video frame sequence is stored in correspondence to the corresponding audio to be selected, such that the corresponding key video frame sequence is directly retrieved when the target audio is determined, to generate the target effect audio and video. If the target audio is the audio to be processed that is uploaded in real time, the target audio may be processed after uploaded, so as to obtain the corresponding key video frame sequence to generate the target effect audio and video in the presence of the key video frame sequence.

In practical application, for same speech content, when a corresponding language type changes, a corresponding mouth shape feature may change as well. For example, for a same news broadcast audio, a mouth opening extent during reading in English is different from that during reading in Chinese. Based on this, based on the above-mentioned solutions, the method further includes: determining the key video frame sequence corresponding to the target audio based on a pre-selected target language type corresponding to the target audio.

It should be noted that after the target audio is determined, a display list or a display control including a plurality of language types may be displayed in the display interface, and the target language type corresponding to the target audio may be determined based on a trigger operation of the user. Alternatively, after the target audio is determined, geographic region information of a region to which a current image processing device belongs may be obtained, and a corresponding language type may be determined as the target language type based on the geographic region information, such that the key video frame sequence corresponding to the target language type may be retrieved.

It should be further noted that at the early development stage of the effect prop, when the plurality of audios to be selected are determined, key video frame sequences corresponding to the audios to be selected in different language types may be determined and stored in correspondence, such that the corresponding key video frame sequence may be directly retrieved when the target audio and the target language type are determined. In this way, target audios of different language types can be processed, which enhances the richness of the effect audio and video, and improves user experience.

S130: Determine, based on the key video frame sequence and the target facial image, a target facial feature in the target facial image that is presented when the target audio is played.

In this embodiment, the key video frame sequence includes a plurality of key video frames, where each of the key video frames includes the user and a facial feature of the user, and the facial features match corresponding facial features presented when the target audio is played.

In practical application, the key video frame sequence is determined based on the target audio. As each of the key video frames has its corresponding time stamp, the key video frames are spliced based on the displayed time stamps, so as to obtain the key video frame sequence. Duration of the key video frame sequence is compared with duration of the target audio. If the duration of the key video frame sequence is consistent with the duration of the target audio, when the corresponding video is generated based on the target audio, all video frames of the video may be used as the key video frames, i.e., the key video frame sequence may include all the video frames corresponding to the target audio; or if the duration of the key video frame sequence is inconsistent with the duration of the target audio, when the corresponding video is generated based on the target audio, frame extraction may be performed on the video to obtain video frames with prominent features from the video as the key video frames, and the key video frame sequence may be generated based on these key video frames.

The target facial feature may include a feature of any facial organ, such as a mouth feature, an eye feature, or an eyebrow feature.

In practical application, when the target facial feature is determined based on the key video frame sequence and the target facial image, the target facial feature may also be determined based on a comparison between the time stamp of each key video frame in the key video frame sequence and a time stamp of the target audio. If the time stamps of some key video frames in the key video frame sequence are consistent with the time stamp of the target audio, when a time point in a process of playing the target audio is consistent with the time stamp of a key video frame in the key video frame sequence, the facial feature in the key video frame may be used as the facial feature in the target facial image. When the playing time stamp of the target audio is inconsistent with the playing time stamp of any one of the key video frames in the key video frame sequence, the facial feature in the target facial image may be set to be a preset facial feature, for example, the mouth remaining closed or the facial organs remaining in an expressionless state. When the target audio is played, when the playing time stamp is consistent with the time stamp of a key video frame in the key video frame sequence, the facial feature corresponding to the current key video frame may be used as the target facial feature in the target facial image; or when the playing time stamp is inconsistent with the time stamp of any of the key video frames in the key video frame sequence, the preset facial feature that is set may be used as the target facial feature in the target facial image. It should be noted that when the duration of the key video frame sequence is consistent with the duration of the target audio, all facial features of the user in the video generated based on the target audio may be used as target facial features.

For example, after the key video frame sequence is determined, the key video frame sequence and the target facial image may be processed to determine, based on the facial feature of the user corresponding to each key video frame in the key video frame sequence and the preset facial feature, the target facial feature in the target facial image that is presented when the target audio is played, thereby achieving an effect that the facial feature in the target facial image is consistent with the facial feature presented when the target audio is played.

S140: Determine the target effect audio and video based on the target facial feature and the target audio.

In this embodiment, after the target facial feature is determined, the target facial feature may be combined with the target audio so as to obtain the target effect audio and video whose playing duration is the same as the target audio and in which the facial feature of the target object is consistent with the target facial feature.

It can be understood that in any picture frame of the target effect audio and video, a facial feature of the target object matches a target facial feature at the same time point.

In practical application, the target effect audio and video may be generated in real time on the client, or the effect audio and video may be generated by post-processing a pre-stored video.

According to this embodiment of the present disclosure, the target facial image including the target object is acquired in response to the effect trigger operation. Then, the target audio is determined, and the key video frame sequence corresponding to the target audio is determined. The target facial feature in the target facial image that is presented when the target audio is played is determined based on the key video frame sequence and the target facial image. Finally, the target effect audio and video is determined based on the target facial feature and the target audio. In this way, a problem in the related art that when a facial feature in a facial image is driven by an audio to change, facial organs in the facial image cannot change synchronously with the audio or only a mouth shape feature in the facial image changes is solved, an effect of driving, on a device with limited computing power, the facial feature in the target facial image to be consistent with the facial feature presented when the target audio is played is achieved, and user experience is improved.

Figure 2:
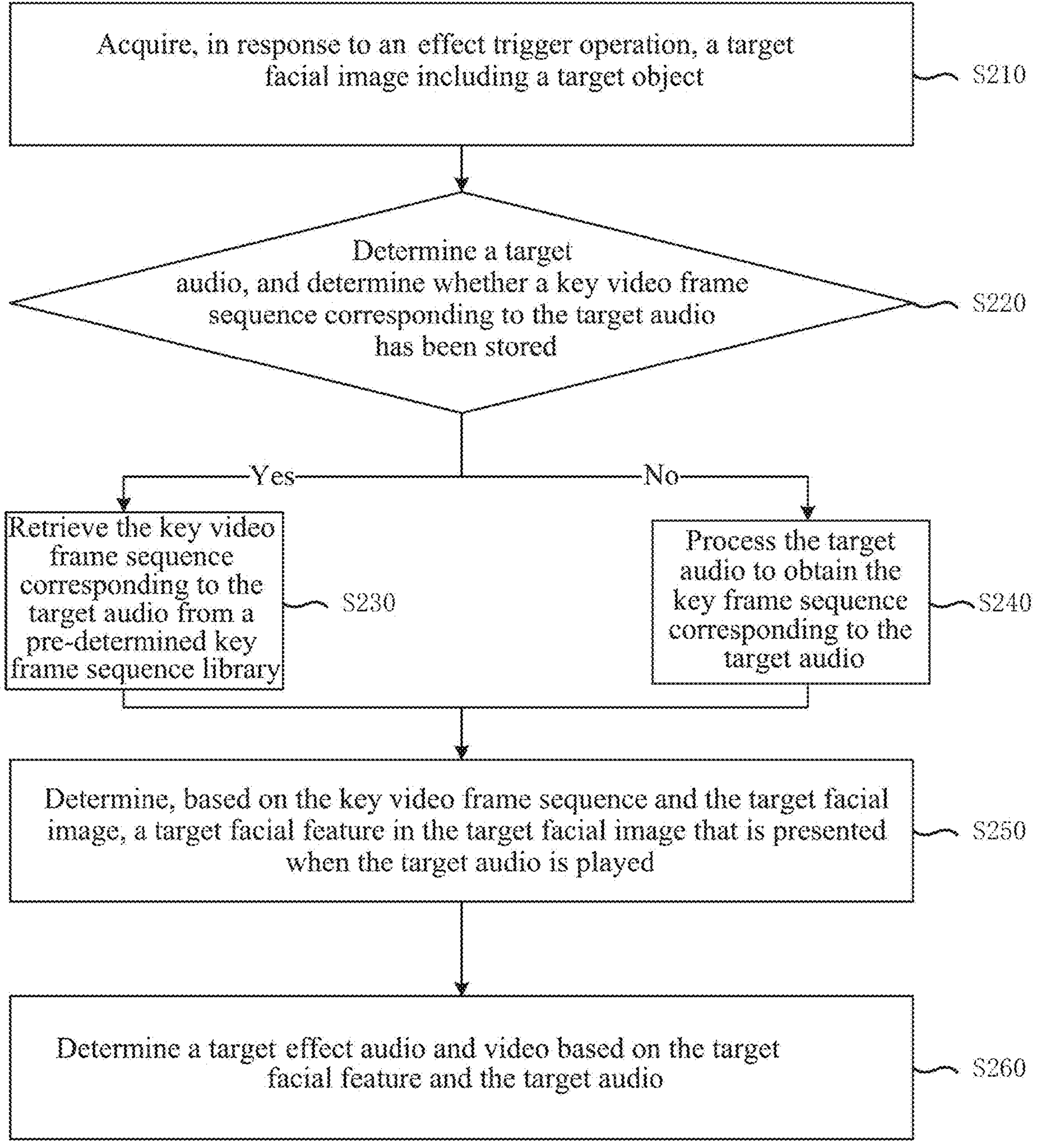
FIG. 2 is a schematic flowchart of a video determination method according to an embodiment of the present disclosure.

FIG. 2 is a schematic flowchart of a video determination method according to an embodiment of the present disclosure. Based on the foregoing embodiment, after the target audio is determined, whether there is the corresponding key video frame sequence may be determined, and the key video frame sequence may be determined based on a determination result. For a specific implementation, reference can be made to this embodiment. Details about technical terms that are the same as or corresponding to those in the above embodiment are not described herein again.

As shown in FIG. 2, the method may include the following steps.

S210: Acquire, in response to an effect trigger operation, a target facial image including a target object.

S220: Determine a target audio, and determine whether a key video frame sequence corresponding to the target audio has been stored, where if the key video frame sequence corresponding to the target audio has been stored, S230 is performed; or if the key video frame sequence corresponding to the target audio has not been stored, S240 is performed.

S230: Retrieve the key video frame sequence corresponding to the target audio from a pre-determined key frame sequence library.

The key frame sequence library includes a corresponding key video frame sequence obtained after at least one audio to be selected is processed. The key video frame sequence includes at least one video frame, and a facial feature of a user in the video frame is inconsistent with a preset facial feature.

In this embodiment, the preset facial feature may be a preset determination criterion for determining whether the facial feature has changed. For example, when the audio to be selected is a news reading speech, the facial feature of the user may change accordingly when the user reads content of the audio to be selected. In various facial features, there may be a feature corresponding to a closed state of the mouth. For the facial feature corresponding to the closed state of the mouth, corresponding audio information cannot be determined based on only a video frame with the facial feature. Therefore, the facial feature corresponding to the closed state of the mouth may be used as the preset facial feature to filter a video frame in which a facial feature is inconsistent with the preset facial feature from the video frame corresponding to the audio to be selected, and a plurality of filtered video frames may be used as the key video frame sequence.

In practical application, while the audio to be selected is determined, a facial feature corresponding to the audio to be selected, as well as a corresponding video frame image, may be determined, and the video frame in which the facial feature is inconsistent with the preset facial feature may be filtered as the key video frame sequence corresponding to each audio to be selected. Each key video frame sequence and the corresponding audio to be selected are stored in correspondence in the key video frame sequence library. When the user selects the target audio from the at least one audio to be selected, the key video frame sequence corresponding to the target audio may be retrieved from the key video frame sequence library as the key video frame sequence of the target audio. In this way, a prominent facial feature and the key video frame sequence that correspond to the target audio may be filtered, such that when the solution is applied to a device with limited computing power, image processing of the device can be reduced, improving the effect video processing efficiency of the device.

S240: Process the target audio to obtain a key frame sequence corresponding to the target audio.

After the target audio is determined, the target audio is processed, a facial feature corresponding to the target audio, as well as a corresponding video frame, is determined, a video frame in which a facial feature is inconsistent with a preset facial feature is filtered from the video frame, and the filtered video frame is determined as the key video frame sequence of the target audio.

It should be noted that the facial feature may include a mouth shape feature and a facial organ feature. Different methods for determining the key video frame sequence are used for different facial features. A corresponding method for determining the key video frame sequence when the facial feature is the mouth shape feature and a corresponding method for determining the key video frame sequence when the facial feature is the facial organ feature may be separately described below.

It should be further noted that when the audio to be selected is processed in advance to obtain and store the corresponding key video frame sequence, determination of the key video frame sequence corresponding to the audio to be selected may alternatively be implemented by the following method.

In practical application, the facial feature includes the mouth shape feature. Optionally, determining the key video frame sequence includes: obtaining a facial image to be displayed; obtaining, based on the facial image to be displayed and the audio to be selected or the target audio, an audio and video to be processed in which a mouth shape feature in the facial image to be displayed is consistent with a mouth shape feature presented when the audio to be displayed or the target audio is played; and using, as the key video frame sequence, a plurality of audio and video frames of the audio and video to be processed in which mouth shape features are inconsistent with a preset mouth shape feature.

The facial image to be displayed may be an image that needs to be processed and includes facial contour information. The facial image to be displayed may be shot by the user through a camera apparatus, or may be obtained from a storage space at which it is pre-stored. The preset mouth shape feature may be a preset determination criterion for determining whether a mouth shape feature of the target object has changed. For example, the preset mouth shape feature may be a mouth shape feature corresponding to a closed state of the mouth.

In practical application, when the target audio is played, a corresponding mouth shape feature may be determined based on a pronunciation of each word in content of the audio played. After the facial image to be displayed is obtained, the facial image to be displayed and the target audio may be processed to keep a mouth shape feature of an object included in the facial image to be displayed consistent with the mouth shape feature presented when the target audio is played, so as to obtain the audio and video to be processed. In order to apply the solution to a device with limited computing power, video frames in the audio and video to be processed may be filtered to filter audio and video frames in which mouth shape features are inconsistent with the preset mouth shape feature, and the audio and video frames are used as the key video frame sequence. In this way, filtering the key video frame sequence can achieve an effect that when a corresponding effect function is triggered on the device with limited computing power, a corresponding key video frame sequence can be directly retrieved, thereby improving the effect video processing efficiency.

In this embodiment, the facial image to be displayed and the audio to be selected or the target audio may be processed through a pre-trained audio driving model, to obtain the audio and video to be processed.

It should be noted that before the audio driving model of this embodiment of the present disclosure is used, it is first necessary to train an audio driving model to be trained. A training process of the model may be: obtaining at least one first training sample, where the first training sample includes a sample audio, a sample facial image, and a theoretical audio and video consistent with a mouth shape feature; inputting, for each first training sample, the sample audio and the sample facial image in the current first training sample into the audio driving model to be trained, so as to obtain an actual audio and video; and determining a loss value based on the actual audio and video and the theoretical audio and video in the current first training sample, correcting, based on the loss value, a model parameter of the audio driving model to be trained, and using convergence of a loss function in the audio driving model to be trained as a training target, to obtain a trained audio driving model.

In practical application, when the facial feature further includes the facial organ feature, determination of the key video frame sequence corresponding to the audio to be selected may be implemented through a neural network model deployed on a server. Optionally, determining the key video frame sequence includes: processing, based on a pre-trained facial driving model, the audio and video to be processed and a facial image to be processed, so as to obtain an audio and video to be selected in which a facial organ feature in the facial image to be processed changes; sequentially determining a facial organ feature in each audio and video frame of the audio and video to be selected; using, as a key video frame, an audio and video frame in which the facial organ feature is inconsistent with a preset facial organ feature; and determining, based on time stamps of a plurality of key video frames, the key video frame sequence corresponding to the audio and video to be processed.

In this embodiment, the facial driving model may be a pre-trained neural network model for driving feature points of a facial image. The facial image to be processed may be a facial image shot in real time by the user through the camera apparatus, or may be a pre-stored facial image retrieved by the server from a related database. The audio and video to be processed may be a file including both a sound and an image, where the sound is consistent with the audio to be selected or the target audio, and a mouth shape feature in the image is consistent with the mouth shape feature in the facial image to be displayed.

In practical application, after the audio and video to be processed and the facial image to be processed are input into the facial driving model for processing, the model may output the audio and video to be selected in which the facial organ feature is different from the facial organ feature in the facial image to be processed. The audio and video to be selected includes a plurality of audio and video frames. A current facial organ feature in each audio and video frame may be determined based on a pronunciation of each speech word in the audio and video to be selected, and video frames in which facial organ features are inconsistent with the preset facial organ feature are filtered from these audio and video frames as key video frames. As the key video frame matches playing duration of the audio to be selected, each key video frame has its corresponding time stamp. After the key video frame is determined, the key video frame sequence corresponding to the audio to be selected may be determined based on the time stamp of each key video frame, i.e., each key video frame is arranged based on a sequence of the time stamp, and the key video frame sequence and the corresponding audio to be selected are stored in correspondence, such that the key video frame sequence corresponding to the target audio may be retrieved from each pre-stored key video frame sequence when the target audio is determined from the at least one audio to be selected. In this way, each audio to be selected can be processed based on the model deployed on the server, to obtain the key video frame sequence corresponding to the audio to be selected, such that when a corresponding effect function is triggered on the device with limited computing power, a corresponding key video frame sequence can be directly retrieved, improving the processing efficiency of the effect video.

It should be noted that before the facial driving model of this embodiment of the present disclosure is used, it is first necessary to train a facial driving model to be trained. A training process of the model may be: determining basic facial organ feature point data of the sample facial image and reference facial organ feature point data of a sample audio and video, and determining difference facial feature data of the sample audio and video based on the basic facial organ feature point data and the reference facial organ feature point data; determining, based on difference facial feature data of each sample audio and video frame and the basic facial organ feature point data, expected facial organ feature point data corresponding to the sample facial image in each sample audio and video; inputting the basic facial organ feature point data of the sample facial image and the corresponding expected facial organ feature point data into the facial driving model to be trained, to obtain an actual audio and video frame; and determining a loss value based on the actual audio and video frame and the corresponding sample audio and video frame, correcting, based on the loss value, a model parameter of the facial driving model to be trained, and using convergence of a loss function in the facial driving model to be trained as a training target, to obtain a trained facial driving model.

S250: Determine, based on the key video frame sequence and the target facial image, a target facial feature in the target facial image that is presented when the target audio is played.

S260: Determine a target effect audio and video based on the target facial feature and the target audio.

According to this embodiment of the present disclosure, the target facial image including the target object is acquired in response to the effect trigger operation. Then, the target audio is determined, whether the key video frame sequence corresponding to the target audio has been stored is determined, and the key video frame sequence corresponding to the target audio is determined based on the determination result. The target facial feature in the target facial image that is presented when the target audio is played is determined based on the key video frame sequence and the target facial image. Finally, the target effect audio and video is determined based on the target facial feature and the target audio. In this way, a problem in the related art that when a facial feature in a facial image is driven by an audio to change, facial organs in the facial image cannot change synchronously with the audio or only a mouth shape feature in the facial image changes is solved, and an effect of driving, on the device with limited computing power, the facial feature in the target facial image to be consistent with the facial feature presented when the target audio is played is achieved.

Figure 3:
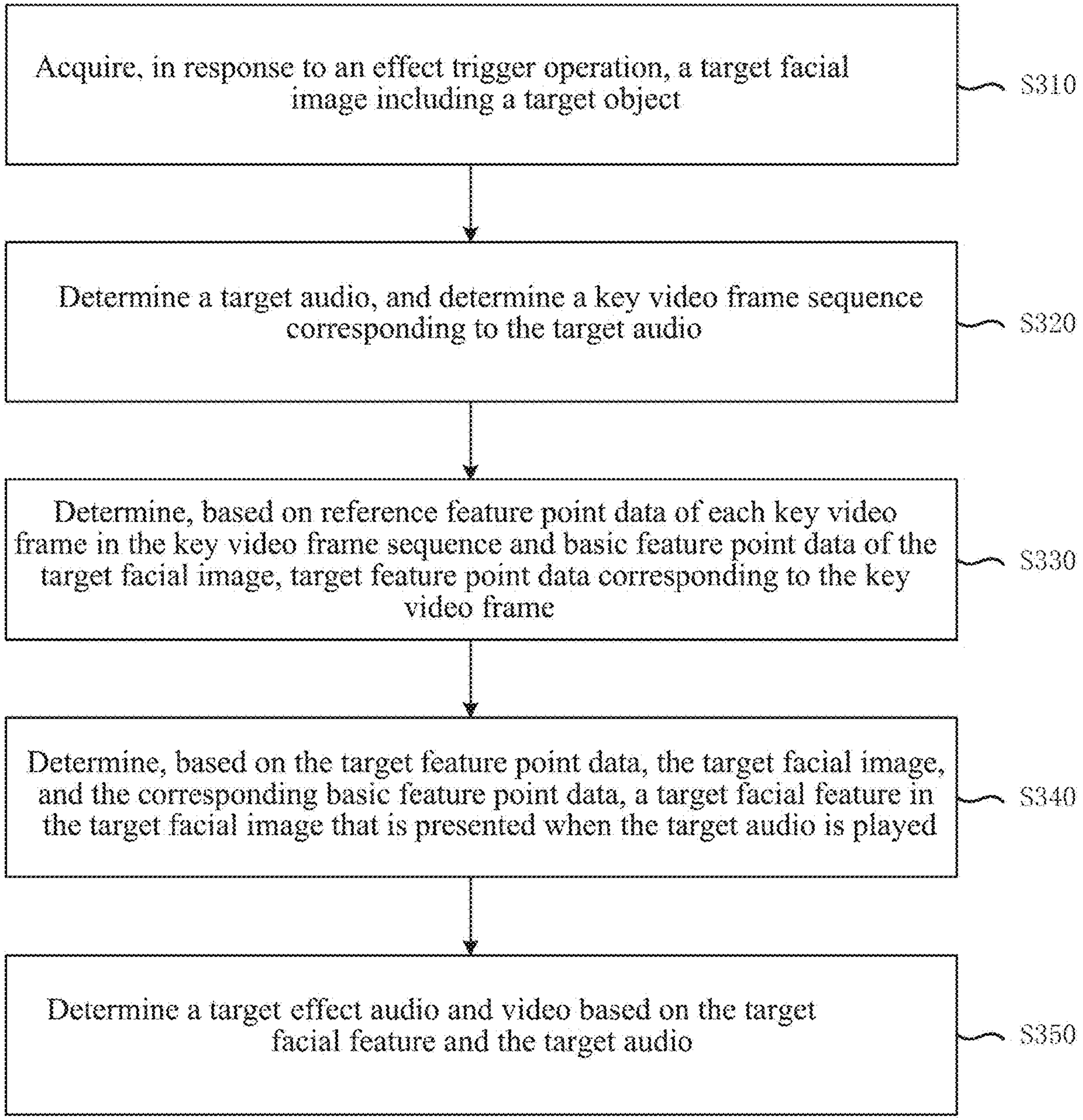
FIG. 3 is a schematic flowchart of a video determination method according to an embodiment of the present disclosure.

FIG. 3 is a schematic flowchart of a video determination method according to an embodiment of the present disclosure. Based on the foregoing embodiment, when the target facial feature is determined, the target facial feature of the target object presented when the target audio is played may be determined based on a difference between a basic feature point of the target facial image and a reference feature point of each key video frame, to ensure that the target facial feature is consistent with the facial feature presented when the target audio is played. For a specific implementation, reference can be made to this embodiment. Details about technical terms that are the same as or corresponding to those in the above embodiment are not described herein again.

As shown in FIG. 3, the method may include the following steps.

S310: Acquire, in response to an effect trigger operation, a target facial image including a target object.

S320: Determine a target audio, and determine a key video frame sequence corresponding to the target audio.

S330: Determine, based on reference feature point data of each key video frame in the key video frame sequence and basic feature point data of the target facial image, target feature point data corresponding to the key video frame.

The reference feature point data corresponds to facial organ feature point data or mouth shape feature point data.

In this embodiment, the reference feature point data may be position information of a facial organ feature key point displayed in each key video frame. For example, at least one key point is set around the mouth, and position information of each key point corresponding to the mouth in each key video frame is used as reference feature point data. The basic feature point data may be position information of a facial organ feature key point of the target object in the target facial image that is in a stationary state, i.e., position information of a facial organ feature point of the target object corresponding to a closed state of the mouth. In practical application, after the reference feature point data of the facial organs in each key video frame and the basic feature point data of the target facial image are determined, the two kinds of feature point data may be compared to make feature point data of the target facial image consistent with the reference feature point data, and the feature point data corresponding to the target facial image at this time may be used as the target feature point data.

Optionally, determining, based on the reference feature point data of each key video frame in the key video frame sequence and the basic feature point data of the target facial image, the target feature point data corresponding to the key video frame includes: determining, for each key video frame, the reference feature point data of the current key video frame and the basic feature point data of the target facial image, and determining difference feature data from the current key video frame; and determining, based on the difference feature data from each key video frame and the basic feature point data, the target feature point data corresponding to the target facial image in each key video frame.

In this embodiment, the difference feature data may be a difference value between the basic feature point data and the reference feature point data. For example, when the reference feature point data and the basic feature point data are both the position information of each key point around the mouth, a position offset of each key point around the mouth between the two kinds of feature point data is determined, and the offset may be used as the difference feature data.

In practical application, for each key video frame, the reference feature point data of the current key video frame and the basic feature point data of the target facial image are determined, and the difference feature data from the current video frame is determined based on the two kinds of feature point data. The basic feature point data of the target facial image may be combined with the difference feature data from each key video frame, to obtain the target feature point data corresponding to the target facial image in each key video frame. In this way, the difference between the reference feature point data of each key video frame and the basic feature point data may be determined to determine the target feature point data of the target facial image in each key video frame, so that an effect that the difference feature data can be determined frame by frame is achieved, which lays a foundation for subsequent generation of a target effect audio and video.

S340: Determine, based on the target feature point data, the target facial image, and the corresponding basic feature point data, a target facial feature in the target facial image that is presented when the target audio is played.

In this embodiment, after the target feature point data corresponding to the target facial image in each key video frame is determined, in order to obtain a complete target effect audio and video, when a time stamp of a target effect audio and video frame is consistent with a time stamp of each key video frame, a facial feature point of the target facial image in the current target effect audio and video frame may be processed based on the target feature point data in the current key video frame, to obtain a target effect audio and video frame consistent with the target feature point data; or when a time stamp of a target effect audio and video frame is inconsistent with a time stamp of each key video frame, the basic feature point data of the target facial image may be used as feature point data of the target effect audio and video frame, to finally determine the target facial feature in the target facial image that is presented when the target audio is played.

In practical application, the target facial feature may be determined based on a neural network model. Optionally, generating, based on the target feature point data, the target facial image, and the corresponding basic feature point data, a target effect audio and video in which a mouth shape feature of the target object is consistent with the target audio includes: inputting the target feature point data, the target facial image, and the corresponding basic feature point data into a pre-trained effect audio and video generation model to obtain the target facial feature of the target object.

The effect audio and video generation model may be a pre-trained neural network model for combining a specific audio and a specific image.

It should be noted that before the effect audio and video generation model of this embodiment of the present disclosure is used, it is first necessary to train an effect audio and video generation model to be trained, and before the model is trained, a plurality of training samples may be constructed to train the model based on the training samples. In order to improve the accuracy of the model, as many and rich training samples as possible may be constructed.

Based on this, based on the above-mentioned solutions, the method further includes: determining sound-picture synchronized videos to be trained that correspond to at least one audio to be trained in different language types; determining, based on the sound-picture synchronized video to be trained and facial images to be selected of different objects to be selected, a first key frame sequence of the different objects to be selected in the corresponding sound-picture synchronized video to be trained; and obtaining a facial image to be applied of an object to be applied, the first key video frame sequence, and facial feature data to be trained that corresponds to the facial image to be applied, to construct a training sample for training the effect audio and video generation model.

In this embodiment, for a same audio to be trained, different facial features are presented when each word in the audio to be trained is pronounced in different language types. For example, for a same news reading audio, a facial feature presented during reading in English is different from that presented during reading in Chinese. Accordingly, the sound-picture synchronized videos to be trained may be videos in which a facial feature corresponding to the audio is synchronous with a facial feature displayed in a picture when each word in the audio to be trained is pronounced in the different language types. The facial image to be selected may be shot by the user through a camera apparatus, or may be obtained from a storage space at which it is pre-stored. In addition, each facial image to be selected includes a different object to be selected. It should be noted that in order to obtain an effect audio and video generation model applicable to objects with different facial features, when training samples are constructed, objects to be selected that have different facial features may be selected, which may optionally be objects to be selected in different countries or objects to be selected of different ages. The facial images to be selected of the different objects to be selected and the sound-picture synchronized video to be trained may be processed to obtain a plurality of key video frames of the different objects to be selected in the corresponding sound-picture synchronized video to be trained, so as to construct the first key video frame sequence based on these key video frames.

The facial image to be applied may be any one of the facial images to be selected, or may be another facial image. The facial feature data to be trained may be basic facial feature data of the object to be applied in the facial image to be applied.

In practical application, the facial image to be applied of the object to be applied and the facial feature data to be trained that corresponds to the facial image to be applied are determined, so as to construct, based on the facial image to be applied, the first key video frame sequence, and the facial feature data to be trained, the training sample for training the effect audio and video generation model. In this way, the effect audio and video generation model deployed on a client can process audios and facial images in different language types, so as to generate a variety of effect audios and videos. In addition, the processing efficiency of the model is improved, and user experience is improved.

In this embodiment, after the training sample is constructed, the effect audio and video generation model may be trained. A model training process may be: obtaining a plurality of training samples; determining, for each training sample, difference feature data of a first key frame sequence based on reference facial feature data of each key video frame in the first key video frame sequence and basic facial feature data of the facial image to be applied in the current training sample, and determining expected facial feature data of the facial image to be applied in each key video frame based on the difference feature data and the basic facial feature data; inputting the facial image to be applied in the current training sample and the expected facial feature data into the effect audio and video generation model to be trained, to obtain actual facial feature data of the facial image to be applied; and determining a loss value based on the actual facial feature data and the facial feature data to be trained, correcting, based on the loss value, a model parameter of the effect audio and video generation model to be trained, and using convergence of a loss function in the effect audio and video generation model to be trained as a training target, to obtain a trained effect audio and video generation model.

In practical application, after the trained effect audio and video generation model is obtained, the target feature point data, the target facial image, and the corresponding basic feature point data may be input into the effect audio and video generation model to obtain the target facial feature of the target object. In this way, the target facial image and the target audio may be processed with an effect in real time via the effect audio and video generation model deployed on the client, so as to obtain the corresponding target facial feature, improving the efficiency of generating the target effect audio and video and improving user experience.

S350: Determine a target effect audio and video based on the target facial feature and the target audio.

According to this embodiment of the present disclosure, the target facial image including the target object is acquired in response to the effect trigger operation. Then, the target audio is determined, and the key video frame sequence corresponding to the target audio is determined based on a pre-selected target language type corresponding to the target audio. The target feature point data corresponding to each key video frame in the key video frame sequence is determined based on the reference feature point data of the key video frame and the basic feature point data of the target facial image. The target facial feature in the target facial image that is presented when the target audio is played is determined based on the target feature point data, the target facial image, and the corresponding basic feature point data. Finally, the target effect audio and video is determined based on the target facial feature and the target audio. In this way, a problem in the related art that when a facial feature in a facial image is driven by an audio to change, facial organs in the facial image cannot change synchronously with the audio or only a mouth shape feature in the facial image changes is solved, and an effect of driving, on a device with limited computing power, the facial feature in the target facial image to be consistent with the facial feature presented when the target audio is played is achieved. In addition, the basic facial feature point data of the target facial image and the reference feature point data of the key video frame sequence are processed, so that the accuracy of the target facial feature is improved, and a foundation is laid for subsequent generation of the target effect audio and video.

Figure 4:
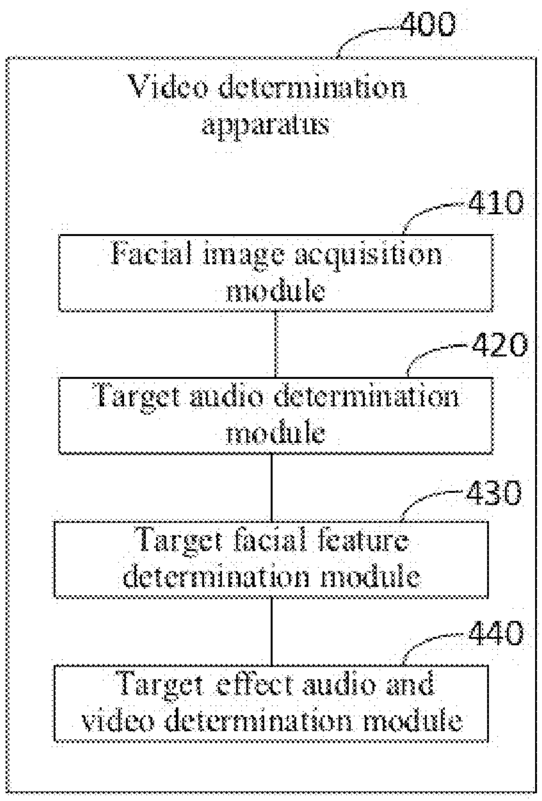
FIG. 4 is a schematic diagram of a structure of a video determination apparatus according to an embodiment of the present disclosure.

FIG. 4 is a schematic diagram of a structure of a video determination apparatus according to an embodiment of the present disclosure. As shown in FIG. 4, the video determination apparatus 400 is configured in a client, and includes a facial image acquisition module 410, a target audio determination module 420, a target facial feature determination module 430, and a target effect audio and video determination module 440.

The facial image acquisition module 410 is configured to acquire, in response to an effect trigger operation, a target facial image including a target object.

The target audio determination module 420 is configured to determine a target audio and determine a key video frame sequence corresponding to the target audio.

The target facial feature determination module 430 is configured to determine, based on the key video frame sequence and the target facial image, a target facial feature in the target facial image that is presented when the target audio is played.

The target effect audio and video determination module 440 is configured to determine a target effect audio and video based on the target facial feature and the target audio.

Optionally, the effect trigger operation includes at least one of the following: triggering an effect prop; a frame-in picture including the target object; triggering an effect wake-up word using audio information; and a current body movement being consistent with a preset effect movement.

Optionally, the target audio determination module 420 includes a target audio determination unit configured to: display at least one audio to be selected, and determine the target audio based on a trigger operation on the at least one audio to be selected within first preset duration; or receive an uploaded audio to be processed as the target audio.

Optionally, the apparatus further includes a key video frame sequence determination module.

The key video frame sequence determination module is configured to determine the key video frame sequence corresponding to the target audio based on a pre-selected target language type corresponding to the target audio.

Optionally, the target audio determination module 420 includes a key video frame retrieval sub-module and a target audio processing sub-module.

The key video frame retrieval sub-module is configured to retrieve the key video frame sequence corresponding to the target audio from a pre-determined key frame sequence library, where the key frame sequence library includes a corresponding key video frame sequence obtained after the at least one audio to be selected is processed.

The target audio processing sub-module is configured to process the target audio to obtain the key frame sequence corresponding to the target audio, where the key video frame sequence includes at least one video frame, and a facial feature of a user in the video frame is inconsistent with a preset facial feature.

Optionally, the facial feature includes a mouth shape feature, and the key video frame retrieval sub-module includes a facial image obtaining unit, an audio and video-to-be-processed determination unit, and a key video frame sequence determination unit.

The facial image obtaining unit is configured to obtain a facial image to be displayed.

The audio and video-to-be-processed determination unit is configured to obtain, based on the facial image to be displayed and the audio to be selected or the target audio, an audio and video to be processed in which a mouth shape feature in the facial image to be displayed is consistent with a mouth shape feature presented when the audio to be displayed or the target audio is played.

The key video frame sequence determination unit is configured to use, as the key video frame sequence, a plurality of audio and video frames of the audio and video to be processed in which mouth shape features are inconsistent with a preset mouth shape feature.

Optionally, the facial feature further includes a facial organ feature, and the key video frame retrieval sub-module includes a facial image-to-be-processed processing unit, a key video frame determination unit, and a key video frame sequence determination unit.

The facial image-to-be-processed processing unit is configured to process, based on a pre-trained facial driving model, the audio and video to be processed and a facial image to be processed, so as to obtain an audio and video to be selected in which a facial organ feature in the facial image to be processed changes.

The key video frame determination unit is configured to use, as a key video frame, an audio and video frame in which the facial organ feature is inconsistent with a preset facial organ feature.

The key video frame sequence determination unit is configured to determine, based on time stamps of a plurality of key video frames, the key video frame sequence corresponding to the audio and video to be processed.

Optionally, the target facial feature determination module 430 includes a target feature point data determination sub-module and a target facial feature determination sub-module.

The target feature point data determination sub-module is configured to determine, based on reference feature point data of each key video frame in the key video frame sequence and basic feature point data of the target facial image, target feature point data corresponding to the key video frame.

The target facial feature determination sub-module is configured to determine, based on the target feature point data, the target facial image, and the corresponding basic feature point data, the target facial feature in the target facial image that is presented when the target audio is played, where the reference feature point data corresponds to facial organ feature point data or mouth shape feature point data.

Optionally, the target feature point data determination sub-module includes a difference feature data determination unit and a target feature point data determination unit.

The difference feature data determination unit is configured to: determine, for each key video frame, the reference feature point data of the current key video frame and the basic feature point data of the target facial image, and determine difference feature data from the current key video frame.

The target feature point data determination unit is configured to determine, based on the difference feature data from each key video frame and the basic feature point data, the target feature point data corresponding to the target facial image in each key video frame.

Optionally, the target facial feature determination sub-module is further configured to determine, in the following manner based on the target feature point data, the target facial image, and the corresponding basic feature point data, the target facial feature in the target facial image that is presented when the target audio is played: inputting the target feature point data, the target facial image, and the corresponding basic feature point data into a pre-trained effect audio and video generation model to obtain the target facial feature of the target object.

Optionally, the apparatus further includes a sound-picture synchronized video-to-be-trained determination module, a first key video frame sequence determination module, and a training sample construction module.

The sound-picture synchronized video-to-be-trained determination module is configured to determine sound-picture synchronized videos to be trained that correspond to at least one audio to be trained in different language types.

The first key video frame sequence determination module is configured to determine, based on the sound-picture synchronized video to be trained and facial images to be selected of different objects to be selected, a first key video frame sequence of the different objects to be selected in the corresponding sound-picture synchronized video to be trained.

The training sample construction module is configured to obtain a facial image to be applied of an object to be applied, the first key video frame sequence, and facial feature data to be trained that corresponds to the facial image to be applied, to construct a training sample for training the effect audio and video generation model.

According to this embodiment of the present disclosure, the target facial image including the target object is acquired in response to the effect trigger operation. Then, the target audio is determined, and the key video frame sequence corresponding to the target audio is determined. The target facial feature in the target facial image that is presented when the target audio is played is determined based on the key video frame sequence and the target facial image. Finally, the target effect audio and video is determined based on the target facial feature and the target audio. In this way, a problem in the related art that when a facial feature in a facial image is driven by an audio to change, facial organs in the facial image cannot change synchronously with the audio or only a mouth shape feature in the facial image changes is solved, an effect of driving, on a device with limited computing power, the facial feature in the target facial image to be consistent with the facial feature presented when the target audio is played is achieved, and user experience is improved.

The video determination apparatus provided in this embodiment of the present disclosure can perform the video determination method provided in any of the embodiments of the present disclosure, and has corresponding functional modules and beneficial effects for performing the method.

It is worth noting that the units and modules included in the above apparatus are obtained through division merely according to functional logic, but are not limited to the above division, as long as corresponding functions can be implemented. In addition, names of the functional units are merely used for mutual distinguishing, and are not used to limit the protection scope of the embodiments of the present disclosure.

Figure 5:
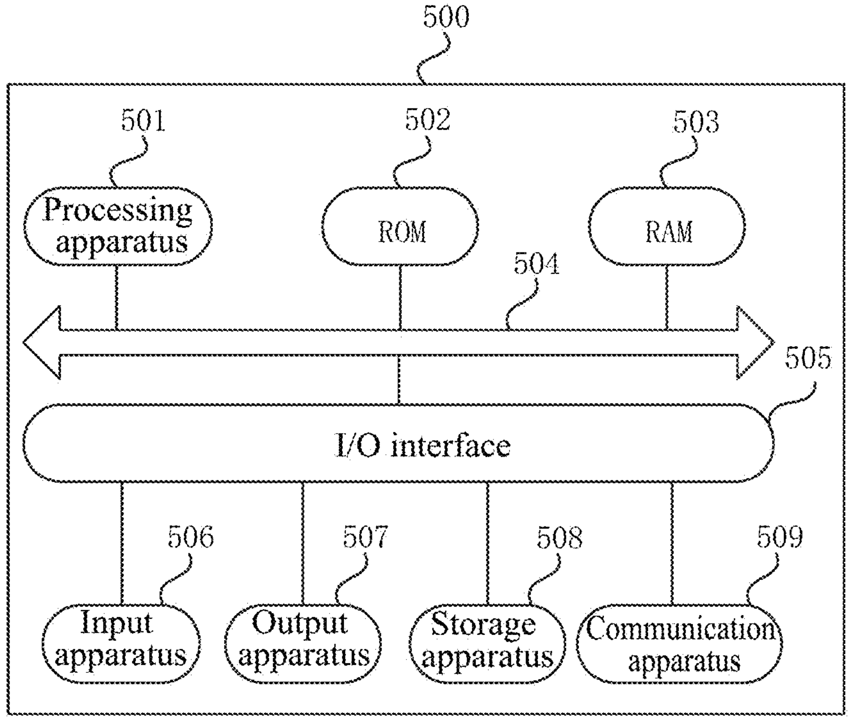
FIG. 5 is a schematic diagram of a structure of an electronic device according to an embodiment of the present disclosure.

FIG. 5 is a schematic diagram of a structure of an electronic device according to an embodiment of the present disclosure. Reference is made to FIG. 5 below, which is a schematic diagram of a structure of an electronic device (such as a terminal device or a server in FIG. 5) 500 suitable for implementing an embodiment of the present disclosure. The terminal device in this embodiment of the present disclosure may include a mobile terminal such as a mobile phone, a notebook computer, a digital broadcast receiver, a personal digital assistant (PDA), a portable Android device (PAD), a portable media player (PMP), and a vehicle-mounted terminal (such as a vehicle navigation terminal), and a fixed terminal such as a digital television (TV) and a desktop computer. The electronic device shown in FIG. 5 is merely an example.

As shown in FIG. 5, the electronic device 500 may include a processing apparatus (e.g., a central processor and a graphics processor) 501, and the processing apparatus 501 may perform a variety of appropriate actions and processing in accordance with a program stored in a read-only memory (ROM) 502 or a program loaded from a storage apparatus 508 into a random-access memory (RAM) 503. The RAM 503 further stores various programs and data required for the operation of the electronic device 500. The processing apparatus 501, the ROM 502, and the RAM 503 are connected to each other through a bus 504. An input/output (I/O) interface 505 is also connected to the bus 504.

Generally, the following apparatuses may be connected to the I/O interface 505: an input apparatus 506 including, for example, a touchscreen, a touchpad, a keyboard, a mouse, a camera, a microphone, an accelerometer, and a gyroscope; an output apparatus 507 including, for example, a liquid crystal display (LCD), a speaker, and a vibrator; the storage apparatus 508 including, for example, a tape and a hard disk; and a communication apparatus 509. The communication apparatus 509 may allow the electronic device 500 to perform wireless or wired communication with other devices to exchange data. Although FIG. 5 shows the electronic device 500 having various apparatuses, it should be understood that it is not required to implement or have all of the shown apparatuses. It may be an alternative to implement or have more or fewer apparatuses.

In an embodiment, the processes described above with reference to the flowcharts may be implemented as a computer software program according to this embodiment of the present disclosure. For example, this embodiment of the present disclosure includes a computer program product, which includes a computer program carried on a non-transitory computer-readable medium, where the computer program includes program code for performing the method shown in the flowchart. In such an embodiment, the computer program may be downloaded and installed from a network through the communication apparatus 509, installed from the storage apparatus 508, or installed from the ROM 502. When the computer program is executed by the processing apparatus 501, the above-mentioned functions defined in the method according to the embodiments of the present disclosure are performed.

The electronic device provided in this embodiment of the present disclosure and the video determination method provided in the above embodiments belong to the same inventive concept. For the technical details not described in detail in this embodiment, reference can be made to the above embodiments, and this embodiment and the above embodiments have the same beneficial effects.

An embodiment of the present disclosure provides a computer storage medium having stored thereon a computer program that, when executed by a processor, causes the video determination method described in the above embodiments to be implemented.

It should be noted that the above computer-readable medium described in the present disclosure may be a computer-readable signal medium, a computer-readable storage medium, or a combination thereof. The computer-readable storage medium may be, for example, electric, magnetic, optical, electromagnetic, infrared, or semiconductor systems, apparatuses, or devices, or any combination thereof. Examples of the computer-readable storage medium may include: an electrical connection having one or more wires, a portable computer disk, a hard disk, a random access memory (RAM), a read-only memory (ROM), an erasable programmable read-only memory (EPROM) or a flash memory, an optical fiber, a portable compact disc read-only memory (CD-ROM), an optical storage device, a magnetic storage device, or a suitable combination thereof. In the present disclosure, the computer-readable storage medium may be a tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including an electromagnetic signal, an optical signal, or a suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including: electric wires, optical cables, radio frequency (RF), etc., or a suitable combination thereof.

In some implementations, a client and a server can communicate using a currently known or future-developed network protocol such as Hypertext Transfer Protocol (HTTP), and may be connected to digital data communication (for example, a communication network) in any form or medium. Examples of the communication network include a local area network (LAN), a wide area network (WAN), an internetwork (for example, the Internet), a peer-to-peer network (for example, an ad hoc peer-to-peer network), and a currently known or future-developed network.

The above computer-readable medium may be contained in the above electronic device. Alternatively, the computer-readable medium may exist independently, without being assembled into the electronic device.

The above computer-readable medium carries at least one program, and the at least one program, when executed by the electronic device, causes the electronic device to perform the following: acquiring, in response to an effect trigger operation, a target facial image including a target object; determining a target audio, and determining a key video frame sequence corresponding to the target audio; determining, based on the key video frame sequence and the target facial image, a target facial feature in the target facial image that is presented when the target audio is played; and determining a target effect audio and video based on the target facial feature and the target audio.

Computer program code for performing operations of the present disclosure can be written in one or more programming languages or a combination thereof, where the programming languages include object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains at least one executable instruction for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should be further noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. Names of the units do not constitute a limitation on the units themselves in some cases. For example, a first obtaining unit may alternatively be described as "a unit for obtaining at least two Internet protocol addresses".

The functions described herein above may be performed at least partially by at least one hardware logic component. For example, exemplary types of hardware logic components that may be used include: a field programmable gate array (FPGA), an application-specific integrated circuit (ASIC), an application-specific standard part (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include electronic, magnetic, optical, electromagnetic, infrared, or semiconductor systems, apparatuses, or devices, or a suitable combination thereof. Examples of the machine-readable storage medium may include an electrical connection based on one or more wires, a portable computer disk, a hard disk, a random access memory (RAM), a read-only memory (ROM), an erasable programmable read-only memory (EPROM) or a flash memory, an optic fiber, a portable compact disk read-only memory (CD-ROM), an optical storage device, a magnetic storage device, or a suitable combination thereof.

According to one or more embodiments of the present disclosure, [Example 1] provides a video determination method, and the method includes:

acquiring, in response to an effect trigger operation, a target facial image including a target object;

determining a target audio, and determining a key video frame sequence corresponding to the target audio;

determining, based on the key video frame sequence and the target facial image, a target facial feature in the target facial image that is presented when the target audio is played; and determining a target effect audio and video based on the target facial feature and the target audio.

According to one or more embodiments of the present disclosure, [Example 2] provides a video determination method, and the method further includes:

optionally, triggering an effect prop;

a frame-in picture including the target object;

triggering an effect wake-up word using audio information; and a current body movement being consistent with a preset effect movement.

According to one or more embodiments of the present disclosure, [Example 3] provides a video determination method, and the method further includes:

optionally, displaying at least one audio to be selected, and determining the target audio based on a trigger operation on the at least one audio to be selected within first preset duration; or receiving an uploaded audio to be processed as the target audio.

According to one or more embodiments of the present disclosure, [Example 4] provides a video determination method, and the method further includes:

optionally, determining the key video frame sequence corresponding to the target audio based on a pre-selected target language type corresponding to the target audio.

According to one or more embodiments of the present disclosure, [Example 5] provides a video determination method, and the method further includes:

optionally, retrieving the key video frame sequence corresponding to the target audio from a pre-determined key video frame sequence library, where the key video frame sequence library includes a corresponding key video frame sequence obtained after the at least one audio to be selected is processed; or processing the target audio to obtain the key video frame sequence corresponding to the target audio, where the key video frame sequence includes at least one video frame, and a facial feature of a user in the video frame is inconsistent with a preset facial feature.

According to one or more embodiments of the present disclosure, [Example 6] provides a video determination method, and the method further includes:

optionally, the facial feature including a mouth shape feature; obtaining a facial image to be displayed;

obtaining, based on the facial image to be displayed and the audio to be selected or the target audio, an audio and video to be processed in which a mouth shape feature in the facial image to be displayed is consistent with a mouth shape feature presented when the audio to be displayed or the target audio is played; and using, as the key video frame sequence, a plurality of audio and video frames of the audio and video to be processed in which mouth shape features are inconsistent with a preset mouth shape feature.

According to one or more embodiments of the present disclosure, [Example 7] provides a video determination method, and the method further includes:

optionally, processing, based on a pre-trained facial driving model, the audio and video to be processed and a facial image to be processed, so as to obtain an audio and video to be selected in which a facial organ feature in the facial image to be processed changes;

sequentially determining a facial organ feature in each audio and video frame of the audio and video to be selected;

using, as a key video frame, an audio and video frame in which the facial organ feature is inconsistent with a preset facial organ feature; and determining, based on a time stamp of each key video frame, the key video frame sequence corresponding to the audio to be processed.

According to one or more embodiments of the present disclosure, [Example 8] provides a video determination method, and the method further includes:

optionally, determining, based on reference feature point data of each key video frame in the key video frame sequence and basic feature point data of the target facial image, target feature point data corresponding to the key video frame; and determining, based on the target feature point data, the target facial image, and the corresponding basic feature point data, the target facial feature in the target facial image that is presented when the target audio is played, where the reference feature point data corresponds to facial organ feature point data or mouth shape feature point data.

According to one or more embodiments of the present disclosure, [Example 9] provides a video determination method, and the method further includes:

optionally, determining, for each key video frame, the reference feature point data of the current key video frame and the basic feature point data of the target facial image, and determining difference feature data from the current key video frame; and determining, based on the difference feature data from each key video frame and the basic feature point data, the target feature point data corresponding to the target facial image in each key video frame.

According to one or more embodiments of the present disclosure, [Example 10] provides a video determination method, and the method further includes:

optionally, inputting the target feature point data, the target facial image, and the corresponding basic feature point data into a pre-trained effect audio and video generation model to obtain the target facial feature of the target object.

According to one or more embodiments of the present disclosure, [Example 11] provides a video determination method, and the method further includes:

optionally, determining sound-picture synchronized videos to be trained that correspond to at least one audio to be trained in different language types;

determining, based on the sound-picture synchronized video to be trained and facial images to be selected of different objects to be selected, a first key video frame sequence of the different objects to be selected in the corresponding sound-picture synchronized video to be trained; and obtaining a facial image to be applied of an object to be applied, the first key video frame sequence, and facial feature data to be trained that corresponds to the facial image to be applied, to construct a training sample for training the effect audio and video generation model.

According to one or more embodiments of the present disclosure, [Example 12] provides a video determination apparatus configured in a client, and the apparatus includes:

a facial image acquisition module configured to acquire, in response to an effect trigger operation, a target facial image including a target object;

a target audio determination module configured to determine a target audio and determine a key video frame sequence corresponding to the target audio;

a target facial feature determination module configured to determine, based on the key video frame sequence and the target facial image, a target facial feature in the target facial image that is presented when the target audio is played; and a target effect audio and video determination module configured to determine a target effect audio and video based on the target facial feature and the target audio.

In addition, although the various operations are depicted in a specific order, it should not be construed as requiring these operations to be performed in the specific order shown or in a sequential order. Under certain circumstances, multitasking and parallel processing may be advantageous.

We claim:

1. A video determination method applied to a client, the method comprising:

acquiring, in response to an effect trigger operation, a first facial image comprising a first object;

determining a first audio, and determining a key video frame sequence corresponding to the first audio;

determining, based on the key video frame sequence and the first facial image, a first facial feature in the first facial image that is presented when the first audio is played; and determining a first effect audio and video based on the first facial feature and the first audio, wherein the key video frame sequence comprises at least one video frame, and a facial feature of a user in the video frame is inconsistent with a second facial feature.

2. The method according to claim 1, wherein the effect trigger operation comprises at least one of the following:

triggering an effect prop;

a frame-in picture comprising the first object;

triggering an effect wake-up word using audio information; and a current body movement being consistent with a first effect movement.

3. The method according to claim 1, wherein the determining a first audio comprises:

displaying at least one second audio, and determining the first audio based on a trigger operation on the at least one second audio within first duration; or receiving an uploaded third audio as the first audio.

4. The method according to claim 1, further comprising:

determining the key video frame sequence corresponding to the first audio based on a pre-selected first language type corresponding to the first audio.

5. The method according to claim 1, wherein the determining a key video frame sequence corresponding to the first audio comprises:

retrieving the key video frame sequence corresponding to the first audio from a pre-determined key video frame sequence library, wherein the first audio is determined from at least one second audio that is displayed in a display interface, and the key video frame sequence library comprises a corresponding key video frame sequence obtained after the at least one second audio is processed; or processing the first audio to obtain the key video frame sequence corresponding to the first audio.

6. The method according to claim 5, wherein the facial feature comprises a mouth shape feature, and the determining the key video frame sequence comprises:

obtaining a second facial image;

obtaining, based on the second audio or the first audio, and the second facial image, a first audio and video in which a mouth shape feature in the second facial image is consistent with a mouth shape feature presented when a third audio or the first audio is played; and using, as the key video frame sequence, a plurality of audio and video frames of the first audio and video in which mouth shape features are inconsistent with a first mouth shape feature.

7. The method according to claim 6, wherein the facial feature further comprises a facial organ feature, and the determining the key video frame sequence comprises:

processing, based on a pre-trained facial driving model, the first audio and video and a third facial image, so as to obtain a second audio and video in which a facial organ feature in the third facial image changes;

sequentially determining a facial organ feature in each audio and video frame of the second audio and video;

using, as a key video frame, an audio and video frame in which the facial organ feature is inconsistent with a first facial organ feature; and determining, based on timestamps of a plurality of key video frames, the key video frame sequence corresponding to the first audio and video.

8. The method according to claim 1, wherein the determining, based on the key video frame sequence and the first facial image, a first facial feature in the first facial image that is presented when the first audio is played comprises:

determining, based on reference feature point data of each key video frame in the key video frame sequence and basic feature point data of the first facial image, first feature point data corresponding to the key video frame; and determining, based on the first feature point data, the first facial image, and the corresponding basic feature point data, the first facial feature in the first facial image that is presented when the first audio is played, wherein the reference feature point data corresponds to facial organ feature point data or mouth shape feature point data.

9. The method according to claim 8, wherein the determining, based on reference feature point data of each key video frame in the key video frame sequence and basic feature point data of the first facial image, first feature point data corresponding to the key video frame comprises:

determining, for each key video frame, the reference feature point data of the current key video frame and the basic feature point data of the first facial image, and determining difference feature data from the current key video frame; and determining, based on the difference feature data from each key video frame and the basic feature point data, the first feature point data corresponding to the first facial image in each key video frame.

10. The method according to claim 8, wherein the determining, based on the first feature point data, the first facial image, and the corresponding basic feature point data, the first facial feature in the first facial image that is presented when the first audio is played comprises:

inputting the first feature point data, the first facial image, and the corresponding basic feature point data into a pre-trained effect audio and video generation model to obtain the first facial feature of the first object.

11. The method according to claim 10, further comprising:

determining sound-picture synchronized videos that correspond to at least one fourth audio in different language types;

determining, based on the sound-picture synchronized video and fourth facial images of different second objects, a first key video frame sequence of the different second objects in the corresponding sound-picture synchronized video; and obtaining a fifth facial image of a third object, the first key video frame sequence, and facial feature data that corresponds to the fifth facial image, to construct a training sample for training the effect audio and video generation model.

12. An electronic device, comprising:

one or more processors; and a storage apparatus configured to store one or more programs, wherein the one or more programs, when executed by the one or more processors, cause the one or more processors to:

acquire, in response to an effect trigger operation, a first facial image comprising a first object;

determine a first audio, and determining a key video frame sequence corresponding to the first audio;

determine, based on the key video frame sequence and the first facial image, a first facial feature in the first facial image that is presented when the first audio is played; and determine a first effect audio and video based on the first facial feature and the first audio;

wherein the key video frame sequence comprises at least one video frame, and a facial feature of a user in the video frame is inconsistent with a second facial feature.

13. A non-transitory storage medium comprising computer-executable instructions that, when executed by a computer processor, cause the computer processor to:

acquire, in response to an effect trigger operation, a first facial image comprising a first object;

determine a first audio, and determining a key video frame sequence corresponding to the first audio;

determine, based on the key video frame sequence and the first facial image, a first facial feature in the first facial image that is presented when the first audio is played; and determine a first effect audio and video based on the first facial feature and the first audio;

wherein the key video frame sequence comprises at least one video frame, and a facial feature of a user in the video frame is inconsistent with a second facial feature.

14. The device according to claim 12, wherein the effect trigger operation comprises at least one of the following:

triggering an effect prop;

a frame-in picture comprising the first object;

triggering an effect wake-up word using audio information; and a current body movement being consistent with a first effect movement.

15. The device according to claim 12, wherein the one or more programs causing the one or more processors to determine the first audio further cause the one more processors to:

display at least one second audio, and determining the first audio based on a trigger operation on the at least one second audio within first duration; or receive an uploaded third audio as the first audio.

16. The device according to claim 12, the one or more programs further cause the one more processors to:

determine the key video frame sequence corresponding to the first audio based on a pre-selected first language type corresponding to the first audio.

17. The device according to claim 12, wherein the one or more programs causing the one more processors to determine the key video frame sequence corresponding to the first audio further cause the one more processors to:

retrieve the key video frame sequence corresponding to the first audio from a pre-determined key video frame sequence library, wherein the first audio is determined from at least one second audio that is displayed in a display interface, and the key video frame sequence library comprises a corresponding key video frame sequence obtained after the at least one second audio is processed; or process the first audio to obtain the key video frame sequence corresponding to the first audio.

18. The device according to claim 17, wherein the facial feature comprises a mouth shape feature, and the one or more programs causing the one more processors to determine the key video frame sequence further cause the one more processors to:

obtain a second facial image;

obtain, based on the second audio or the first audio, and the second facial image, a first audio and video in which a mouth shape feature in the second facial image is consistent with a mouth shape feature presented when a third audio or the first audio is played; and use, as the key video frame sequence, a plurality of audio and video frames of the first audio and video in which mouth shape features are inconsistent with a first mouth shape feature.

19. The device according to claim 18, wherein the facial feature further comprises a facial organ feature, and the one or more programs causing the one more processors to determine the key video frame sequence further cause the one more processors to:

process, based on a pre-trained facial driving model, the first audio and video and a third facial image, so as to obtain a second audio and video in which a facial organ feature in the third facial image changes;

sequentially determine a facial organ feature in each audio and video frame of the second audio and video;

use, as a key video frame, an audio and video frame in which the facial organ feature is inconsistent with a first facial organ feature; and determine, based on timestamps of a plurality of key video frames, the key video frame sequence corresponding to the first audio and video.

20. The device according to claim 12, wherein the one or more programs causing the one more processors to determine, based on the key video frame sequence and the first facial image, the first facial feature in the first facial image that is presented when the first audio is played further cause the one more processors to:

determine, based on reference feature point data of each key video frame in the key video frame sequence and basic feature point data of the first facial image, first feature point data corresponding to the key video frame; and determine, based on the first feature point data, the first facial image, and the corresponding basic feature point data, the first facial feature in the first facial image that is presented when the first audio is played, wherein the reference feature point data corresponds to facial organ feature point data or mouth shape feature point data.

* * * * *